(12) United States Patent
Okano et al.

(10) Patent No.: US 10,276,877 B2
(45) Date of Patent: Apr. 30, 2019

(54) POSITIVE ELECTRODE FOR AIR BATTERY, AND AIR BATTERY USING THE POSITIVE ELECTRODE

(71) Applicants: NATIONAL INSTITUTE OF TECHNOLOGY, Tokyo (JP); TOYO TANSO CO., LTD., Osaka-shi, Osaka (JP)

(72) Inventors: Hiroshi Okano, Takamatsu (JP); Masashi Yoda, Tamano (JP); Takuro Tsuruoka, Sakaide (JP); Toshihiro Hosokawa, Mitoyo (JP); Nobuya Misaki, Mitoyo (JP)

(73) Assignees: NATIONAL INSTITUTE OF TECHNOLOGY, Hachioji-shi (JP); TOYO TANSO CO., LTD., Osaka-shi (JP)

( * ) Notice: Subject to any disclaimer, the term of this patent is extended or adjusted under 35 U.S.C. 154(b) by 0 days.

(21) Appl. No.: 15/036,301

(22) PCT Filed: Nov. 25, 2014

(86) PCT No.: PCT/JP2014/081019
§ 371 (c)(1),
(2) Date: May 12, 2016

(87) PCT Pub. No.: WO2015/076402
PCT Pub. Date: May 28, 2015

(65) Prior Publication Data
US 2016/0301086 A1    Oct. 13, 2016

(30) Foreign Application Priority Data

Nov. 25, 2013    (JP) .................................. 2013-242816
Aug. 29, 2014    (JP) .................................. 2014-176007

(51) Int. Cl.
*H01M 4/96*    (2006.01)
*H01M 12/06*   (2006.01)
(Continued)

(52) U.S. Cl.
CPC ............. *H01M 4/96* (2013.01); *H01M 4/463* (2013.01); *H01M 4/8605* (2013.01);
(Continued)

(58) Field of Classification Search
CPC ........ H01M 4/96; H01M 12/06; H01M 4/463; H01M 4/8605; H01M 4/8626; H01M 8/0234
(Continued)

(56) References Cited

U.S. PATENT DOCUMENTS 8,273,497 B2    9/2012 Mizuno
2005/0003271 A1    1/2005 Jiang et al.
(Continued)

FOREIGN PATENT DOCUMENTS

DE    10 2011 108 435 A1    5/2013
JP         56-93265 A    7/1981
(Continued)

OTHER PUBLICATIONS

Yoda et al., "Bocho Kokuen Sheet o Seikyoku to suru Kuki Kinzoku Denchi no Kento"(Study of metal-air battery using the expanded graphite sheet as cathode), Dai 40 Kai Abstracts of Annual Meeting of the Carbon Society of Japan, Dec. 3, 2013, p. 52.
(Continued)

*Primary Examiner* — Cynthia H Kelly
*Assistant Examiner* — Omar M Kekia
(74) *Attorney, Agent, or Firm* — Westerman, Hattori, Daniels & Adrian, LLP (57) ABSTRACT

A positive electrode for an air battery and an air battery using the positive electrode are provided, that make it
(Continued)

possible to inhibit an electrolyte solution decrease in the battery and prevent the problems associated with the electrolyte solution decrease without causing an increase in manufacturing costs.

A positive electrode for an air battery includes an expanded graphite sheet. It is desirable that the expanded graphite sheet contain expanded graphite in an amount of 80 mass % or greater. It is desirable that the expanded graphite have a bulk density of from 0.2 $Mg/m^3$ to 2.0 $Mg/m^3$. It is desirable that the expanded graphite sheet have a thickness of from 0.1 mm to 3.0 mm.

12 Claims, 11 Drawing Sheets (51) Int. Cl.
    *H01M 4/46*      (2006.01)
    *H01M 4/86*      (2006.01)
    *H01M 8/0234*      (2016.01)

(52) U.S. Cl.
    CPC ......... *H01M 8/0234* (2013.01); *H01M 12/06* (2013.01); *H01M 4/8626* (2013.01)

(58) Field of Classification Search
    USPC .......................................................... 429/405
    See application file for complete search history.

(56) References Cited

U.S. PATENT DOCUMENTS

| | | | |
|---|---|---|---|
| 2007/0110661 A1* | 5/2007 | Hirose | C01B 31/0423 423/448 |
| 2013/0280625 A1 | 10/2013 | Shimamune et al. | |
| 2014/0255802 A1* | 9/2014 | Barde | H01M 10/0567 429/405 |

FOREIGN PATENT DOCUMENTS

| | | |
|---|---|---|
| JP | 61-32358 A | 2/1986 |
| JP | 10-189006 A | 7/1998 |
| WO | 2010/084614 A1 | 7/2010 |
| WO | 2012/089658 A1 | 7/2012 |
| WO | 2013/139370 A1 | 9/2013 |

OTHER PUBLICATIONS

International Search Report dated Feb. 17, 2015, issued counterpart International Application No. PCT/JP2014/081019 (2 pages).
SGL Group, "SIGRAFLEX Graphite Foils and Laminated Sheets: SGL Group—The Carbon Company", Jun. 17, 2013, XP055360453, Retrieved from the Internet.
Extended (supplementary) European Search Report dated Apr. 18, 2017, issued in counterpart European Application No. 14864290.3. (9 pages).
Yazici, M. S. et al., "Flexible graphite as battery anode and current collector", Journal of Power Sources, 2005, vol. 141, No. 1, pp. 171-176; cited in Chinese Office Action dated Mar. 5, 2018.
Office Action dated Mar. 5, 2018, issued in counterpart Chinese Application No. 201480056169.7, with English translation. (12 pages).
Office Action dated Aug. 13, 2018, issued in counterpart European Application No. 14 864 290.3 (46 pages).
Office Action dated Sep. 7, 2018, issued in counterpart Chinese Application No. 201480056169.1, with English translation (17 pages).
Office Action dated Sep. 28, 2018, issued in counterpart Taiwanese Application No. 103140806, with English translation (6 pages).

\* cited by examiner

POSITIVE ELECTRODE FOR AIR BATTERY, AND AIR BATTERY USING THE POSITIVE ELECTRODE

TECHNICAL FIELD

The present invention relates to a positive electrode for an air battery, and an air battery using the positive electrode.

BACKGROUND ART

Air batteries are capable of containing a higher proportion of the negative electrode active material in the battery case, in comparison with such as lithium secondary batteries. Therefore, they are capable of obtaining a higher discharge capacity, which means that size reduction and weight reduction of the batteries are easier. Moreover, the air batteries have a low environmental impact because they use oxygen, which is free from constraints on resource availability and also is a clean material, as the positive electrode active material. For these reasons, it is expected that the air batteries will be widely used for such as batteries for electric vehicles, batteries for hybrid vehicles, and batteries for fuel cell vehicles.

Here, it is required that the positive electrode for the air battery have electrical conductivity, chemical stability, and capability of supplying oxygen-originating hydroxide ions. In view of this, a positive electrode for an air battery that has a catalyst layer formed by adding activated carbon and a catalyst to Teflon (registered trademark) (Patent Literature 1) and a positive electrode for an air battery that uses a carbon material that permeates gas but does not permeate liquid (Patent Literature 2) have been disclosed.

CITATION LIST

Patent Literature

[Patent Literature 1] Japanese Published Unexamined Patent Application No. H10-189006
[Patent Literature 2] WO 2010/084614

SUMMARY OF INVENTION

Technical Problem

In the conventional positive electrode for an air battery as described in Patent Literature 1 above, the carbonaceous component existing on the surface has a small surface area, so the supply of hydroxide ions is inhibited by the components other than the carbonaceous component. In addition, the conventional positive electrodes for an air battery as disclosed in Patent Literatures 1 and 2 need to have communicating pores for passing oxygen gas along a thickness direction of the positive electrode, in order to supply oxygen that is necessary for supplying hydroxide ions. However, the communicating pores cause a greater amount of the electrolyte solution to evaporate therethrough, and consequently, the amount of the electrolyte solution decreases. This results in the problems such as the deterioration in battery output power. Another problem has been that the HOPG used in Patent Literature 2 above is a costly material, and therefore the manufacturing cost of the battery is higher.

In view of the problems, it is an object of the present invention to provide a positive electrode for an air battery, as well as an air battery using the positive electrode, that makes it possible to inhibit the electrolyte solution decrease of the battery and preventing the problems associated with the electrolyte solution decrease, without causing an increase in manufacturing costs.

Solution to Problem

In order to accomplish the foregoing object, the present invention provides a positive electrode for an air battery, characterized by comprising an expanded graphite sheet.

Advantageous Effects of Invention

The present invention achieves significant advantageous effects, such as inhibiting the electrolyte solution decrease of the battery and prevent the problems associated with the electrolyte solution decrease, without causing an increase in manufacturing costs.

DESCRIPTION OF EMBODIMENTS

The positive electrode for an air battery according to the present invention is characterized by comprising an expanded graphite sheet.

The expanded graphite sheet has electrical conductivity and chemical stability. In addition, the expanded graphite sheet has micropores formed between the layers of graphite crystals. Therefore, the contact surface area with the electrolyte solution is increased, and the supply of hydroxide ions can be performed efficiently. Moreover, because the expanded graphite sheet does not have communicating pores along its thickness direction, it is capable of inhibiting the evaporation of the electrolyte solution. Nevertheless, it is capable of maintaining the electromotive force even after the oxygen existing near the surface of the sheet has been consumed. The reason for this is not fully understood, but it is believed to be as follows. When an expanded graphite sheet is molded into a sheet shape, graphite particles in a flake form are stacked so as to overlap each other in a thickness direction. As a result, very small gaps are formed between the particles along in-plane directions in the sheet. Oxygen may be supplied by the ambient air that passes through those gaps, and it may serve as the source of hydroxide ions. As a result, the inlet passage through which the ambient air passes is longer than the case where the communicating pores are provided along the thickness direction. Therefore, it is believed that the evaporation of the electrolyte solution is inhibited. Furthermore, the expanded graphite sheet can be produced at relatively low cost. As a result, the manufacturing cost of the air battery can be kept low.

Although the expanded graphite sheet may consist only of expanded graphite, it is also possible to add other substances such as a catalytic substance and a binder. In that case, it is desirable that the content of the expanded graphite in the expanded graphite sheet be 80 mass % or higher, more desirably 90 mass % or higher, and still more desirably 95 mass % or higher.

If the content of the expanded graphite in the expanded graphite sheet is less than 80 mass %, the surface area that comes into contact with the electrolyte solution may be too small, or there is a risk that the binder may close the above-mentioned microgaps along in-plane directions.

It is desirable that the above-described expanded graphite sheet have a bulk density of from 0.2 Mg/m$^3$ to 2.0 Mg/m$^3$.

When the bulk density of the expanded graphite sheet is less than 0.2 Mg/m$^3$, the shape of the sheet may be more likely to break down easily. On the other hand, if the bulk density of the expanded graphite sheet exceeds 2.0 Mg/m$^3$, the volume of the microgaps between the expanded graphite particles may be too small, so the amount of the ambient air passing therethrough may be insufficient, and moreover, the surface area that comes into contact with the electrolyte solution may also become small. As a consequence, the battery performance may deteriorate. Taking these matters into consideration, it is more desirable that the expanded graphite sheet have a bulk density of from 0.3 Mg/m$^3$ to 1.5 Mg/m$^3$, still more desirably from 0.3 Mg/m$^3$ to 0.75 Mg/m$^3$.

It is desirable that the above-described expanded graphite sheet have a thickness of from 0.1 mm to 3.0 mm.

If the thickness of the expanded graphite sheet is less than 0.1 mm, the amount of the air contained therein may be too small, so the amount of oxygen supplied may be insufficient, and moreover, the surface area thereof that comes into contact with the electrolyte solution may also become too small. On the other hand, if the thickness of the expanded graphite sheet exceeds 3.0 mm, the proportion of the positive electrode in the battery may be too high, so the battery may not be able to have a high capacity. It is particularly desirable that the expanded graphite sheet have a thickness of 0.80 mm or greater.

The air battery according to the present invention is characterized in that, in an air battery comprising a positive electrode, a negative electrode, and an electrolyte solution, the positive electrode comprises an expanded graphite sheet.

In addition, it is desirable that the expanded graphite sheet include one side being in contact with the electrolyte solution and the other side opposite the one side, the other side being shielded from ambient air.

Because the other side of the expanded graphite sheet that is opposite the one side being in contact with the electrolyte solution is shielded from ambient air, the gas permeation in a thickness direction is prevented, and as a result, the evaporation of the electrolyte solution is inhibited more effectively.

Here, when the gas permeability of the expanded graphite sheet is restricted to $1.0 \times 10^{-3}$ cm$^2$/s or less, the evaporation of the electrolyte solution can be inhibited sufficiently. In particular, when the gas permeability of the expanded graphite sheet is restricted to $1.0 \times 10^{-4}$ cm$^2$/s or less, the evaporation of the electrolyte solution can be inhibited even more effectively.

The above-described gas permeability of the expanded graphite sheet is represented by the following equation (1).

$$\text{Gas permeability} = Q \cdot L / (\Delta P \cdot A) \qquad (1)$$

Here, in the above equation (1), Q is the gas flow rate (Pa·cm$^3$/s), $\Delta P$ is the pressure difference (Pa) between two chambers, A is the gas transmission area (cm$^2$) of the expanded graphite sheet, which is the area of the passage that allows the two chambers to communicate with each other, and L is the thickness (cm) of the expanded graphite sheet.

Figure 1:
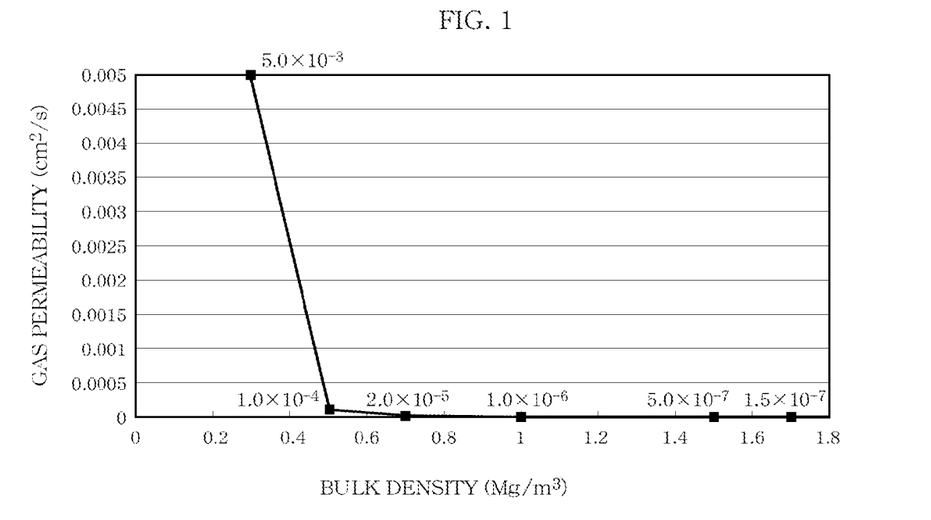
FIG. 1 is a graph illustrating the relationship between bulk density and gas permeability of expanded graphite sheets.

The relationship between bulk density and gas permeability of various expanded graphite sheets is shown in FIG. 1. The bulk densities of the expanded graphite sheets studied here were 0.3 Mg/m$^3$, 0.5 Mg/m$^3$, 0.7 Mg/m$^3$, 1.0 Mg/m$^3$, 1.5 Mg/m$^3$, and 1.7 Mg/m$^3$.

As clearly seen from FIG. 1, when the bulk density of the expanded graphite sheet is 0.2 Mg/m$^3$ or higher, the gas permeability of the expanded graphite sheet results in $1.0 \times 10^{-3}$ cm$^2$/s or less, and when the bulk density of the expanded graphite sheet is 0.5 Mg/m$^3$ or higher, the gas permeability of the expanded graphite sheet results in $1.0 \times 10^{-4}$ cm$^2$/s or less.

The above-mentioned gas permeability is measured in the following manner.

(i) In a pair of hermetically closed chambers CA and CB that are in communication with each other, an expanded graphite sheet of the present invention (diameter 30 mm) is disposed so as to close the passage (diameter 10 mm) that allows the two chambers CA and CB to communicate with each other. In other words, the air is not permitted to flow between the pair of hermetically closed chambers CA and CB, unless the air passes through the expanded graphite sheet of the present invention.

(ii) From this condition, the chambers CA and CB are evacuated until the air pressure in the two chambers CA and CB becomes $1.0\times10^{-4}$ Pa. Then, while one of the chamber CA is being kept evacuated, $N_2$ gas is supplied until the other one of the chamber CB reaches a predetermined pressure ($1.0\times10^5$ Pa).

(iii) When the other one of the chamber CB reaches a predetermined pressure ($1.0\times10^5$ Pa), the evacuation of the one of the chamber CA is stopped. Then, the $N_2$ gas gradually flows from the other one of the chamber CB into the one of the chamber CA according to the pressure difference between the two chambers CA and CB and the gas permeability of the expanded graphite sheet, so the pressure in the one of the chamber CA increases accordingly.

(iv) Then, the rate of pressure increase in the one of the chamber CA is measured for about 100 seconds after the evacuation of the one of the chamber CA has been stopped, and the gas permeability K ($cm^2/s$) is calculated according to the following equation (2).

$$K=Q\cdot L/(P\cdot A) \quad (2)$$

In the above equation, Q is the gas flow rate ($Pa\cdot cm^2/s$), L is thickness (cm) of the sheet-shaped laminate, P is the pressure difference (Pa) between the two chambers CA and CB, and A is the gas transmission area ($cm^2$) of the expanded graphite sheet, which is the area of a passage that allows the two chambers CA and CB to communicate with each other.

The gas flow rate Q can be calculated from the volumetric capacity of the one of the chamber CA and the rate of pressure increase in the one of the chamber CA for about 100 seconds after the evacuation of the one of the chamber CA has been stopped.

The method of measuring the amount of gas permeation in the later-described second and third embodiments will be described with reference to FIGS. 16 and 17(*a*) to 17(*e*).

Figure 16:
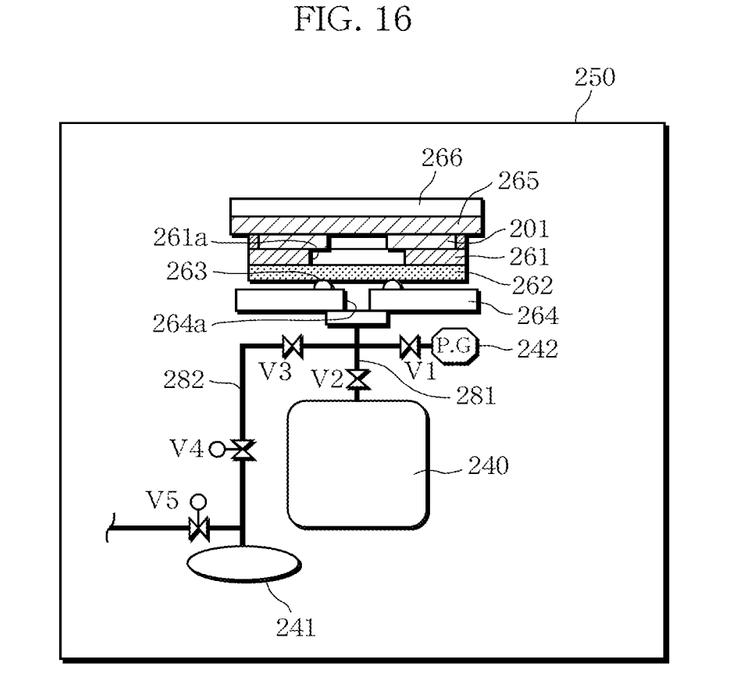
FIG. 16 is a schematic view illustrating an apparatus for measuring the amount of pressure change.
Figure 17:
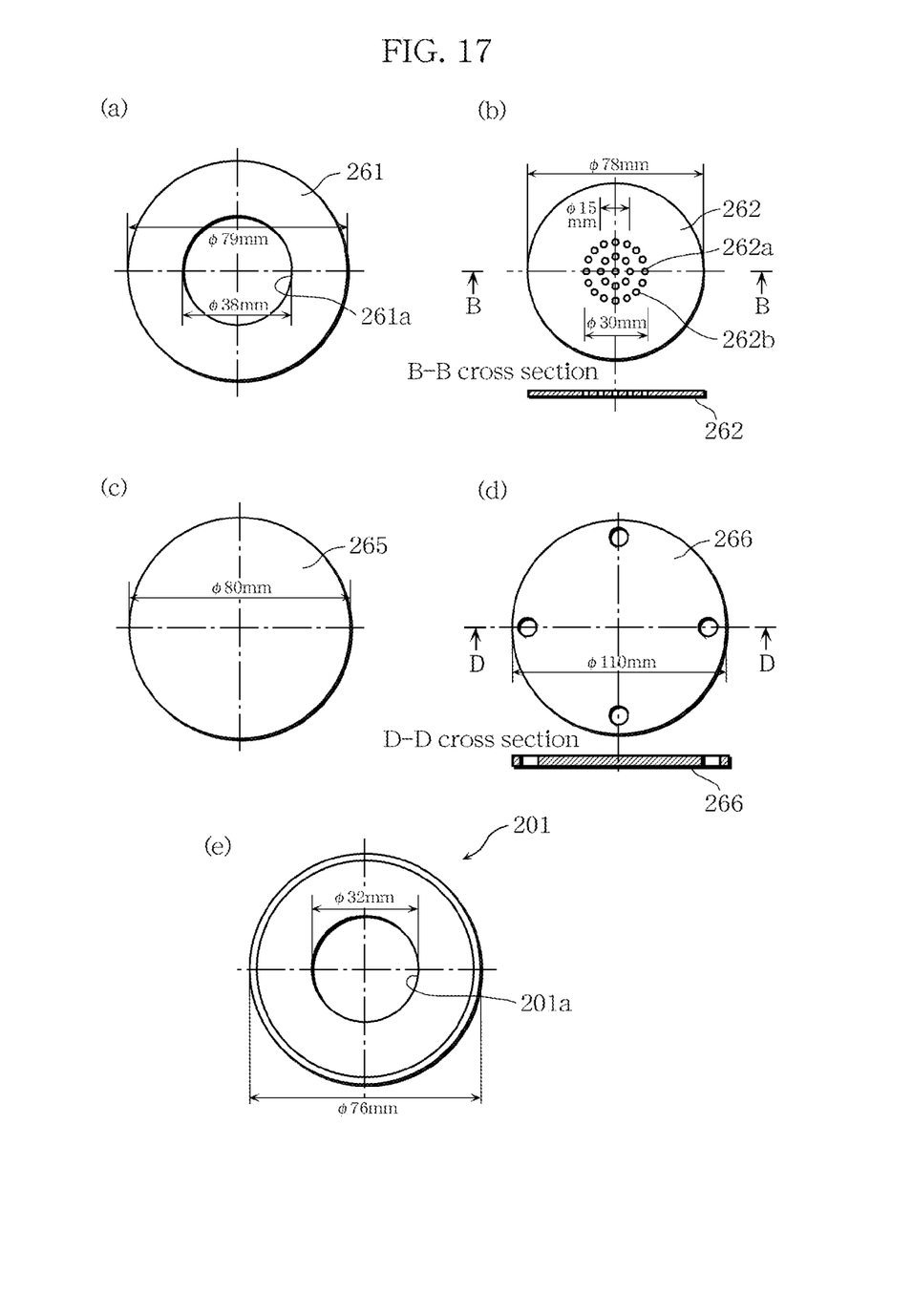
FIG. 17(a) is a plan view of a rubber packing shown in FIG. 16.
FIG. 17(b) shows a plan view and a cross-sectional view of an acrylic plate shown in FIG. 16.
FIG. 17(c) is a plan view of another rubber packing shown in FIG. 16.
FIG. 17(d) shows a plan view and a cross-sectional view of a metal flange shown in FIG. 16.
FIG. 17(e) is a plan view of a sheet-shaped composite material shown in FIG. 16.

In the apparatus shown in FIG. 16, a sheet-shaped composite material 201, a measurement tank 240, a vacuum pump 241, and manometer 242 are disposed in a chamber 250.

The expanded graphite sheet 201 is disposed over an acrylic plate 262 with a rubber packing 261 interposed therebetween. The acrylic plate 262 is disposed over a platform 264 with an O-ring 263 interposed therebetween. The acrylic plate 262 and the platform 264 are sealed by the O-ring 263. A through air hole 261*a* is formed at the center of the rubber packing 261 (see FIG. 17(*a*)). As illustrated in FIG. 17(*b*), a plurality of small through holes 262*a*, 262*b* are formed at and near the center of the acrylic plate 262. As illustrated in FIG. 16, a through-hole 264*a* is also formed at the center of the platform 264.

A metal flange 266 is disposed over the expanded graphite sheet 201 with a rubber packing 265 interposed therebetween. The metal flange 266 is pressed against the sheet-shaped composite material 201 and fastened by screws. The rubber packing 265 and the metal flange 266 are formed in a disk shape, as illustrated in FIGS. 17(*c*) and 17(*d*). The metal flange 266 is provided with four screw holes formed equally spaced from each other in the outer peripheral edge portion thereof. As illustrated in FIG. 17(*e*), a through-hole 201*a* with a diameter of 32 mm is formed in a central region of the sheet-shaped composite material 201.

A first pipe 281 is allowed to communicate with the internal space of the platform 264. The measurement tank 240 is disposed at the other end of the first pipe 281. The first pipe 281 is provided with a valve V2.

A second pipe 282 is crossed with and is allowed to communicate with the first pipe 281. The manometer 242 is disposed at one end of the second pipe 282, and the other end of the second pipe 282 is branched into two parts. The vacuum pump 241 is disposed at one end of the branched parts, and a solenoid valve V5 is disposed at the other end of the branched parts. The valve V1, the valve V3, and the solenoid valve V4 are disposed in that order between the manometer 242 and the branch point B in the second pipe 282.

As illustrated in FIG. 16, since the expanded graphite sheet 201 is sandwiched vertically between the rubber packing 261 and the rubber packing 265, the entry of gas is allowed only through the end face (outer circumferential face) of the expanded graphite sheet 201. The gas passes through the inside of the expanded graphite sheet 201, and is released through the inner circumferential face of the expanded graphite sheet 201 to the space radially inward of the expanded graphite sheet 201 Thereby, the pressure in the internal space formed by the rubber packing 261, the acrylic plate 262, the platform 264, and the expanded graphite sheet 201 changes. When the pressure change is great, it indicates that the amount of gas that has entered through the end face of the expanded graphite sheet and the amount of in-plane gas permeation are great (i.e., the in-plane gas impermeability of the expanded graphite sheet 201 is low). When the pressure change is small, it indicates that the amount of gas that has entered through the end face of the expanded graphite sheet and the amount of in-plane gas permeation are small (i.e., the in-plane gas impermeability of the expanded graphite sheet 201 is desirable). The pressure in the internal space formed by the rubber packing 261, the acrylic plate 262, and the platform 264 is measured by the above-described measurement tank 240. The method of measuring the pressure is described below.

The initial pressure of the chamber is set to 190 Pa. The volumetric capacity of the chamber and the dimensions of the expanded graphite sheet 201 are shown below.

The volumetric capacity of the chamber is 11,050 $cm^3$.

The end face of the expanded graphite sheet 201 that is exposed to the outside (i.e., the outer circumferential face of the expanded graphite sheet 201): The outer circumferential face has a diameter of 76 mm.

The end face of the expanded graphite sheet 201 that is exposed to the inside of the chamber (i.e., the inner circumferential face of the sheet-shaped composite material 201): The inner circumferential face has a diameter of 32 mm.

1) Turn on the power of the measurement tank 240 and the vacuum pump 241 system.
2) Make sure that the valve V1 is open and the valves V2 and V3 are closed.
3) Clean up the O-ring 263, and place the acrylic plate 262 on the O-ring 263.
4) Place the rubber packing 261 on the acrylic plate 262, and set the sheet-shaped composite material 201 thereon.
5) Place the rubber packing 265 on the expanded graphite sheet 201.
6) Fasten the metal flange 266 to the acrylic plate 262 with bolts.
7) Open the solenoid valve V4, and start the vacuum pump.
8) Open the valves V1, V2, and V3.
9) Carry out the evacuation while setting the target pressure to 190 Pa.
10) Close the valve V3.
11) Obtain pressure P1 from the manometer.
12) Open the solenoid valve V5.
13) Close the solenoid valve V4.

14) After about 1 minute, turn off the vacuum pump 241, and close the solenoid valve V5.
15) Close the valve V3, and 30 minutes later, obtain pressure P2 with the manometer 242.
16) Close the valve V2, and take out the expanded graphite sheet 201.

From the foregoing, the pressure change can be calculated by the following equation (3).

$$\text{Pressure change } \Delta P = P_2 - P_1 \quad (3)$$

Here,
$P_1$: Target pressure (190 Pa), and
$P_2$: Pressure after the measurement.

Using the pressure change calculated by the equation (3), the amount of in-plane gas permeation, which is the amount of the gas that has entered from the end face of the expanded graphite sheet 201 and permeated in in-plane directions, can be calculated by the following equation (4).

$$\text{Amount of in-plane gas permeation (Pa·m}^3\text{)} = \text{pressure change } (\Delta P) \times \text{volumetric capacity of measurement tank } (V) \quad (4)$$

V: Measurement tank volumetric capacity 11,050 cm³ (0.01105 m³) (diameter 190 mm×height 390 mm)

It is desirable to use an expanded graphite sheet having an amount of gas permeation of 0.03 Pa·m³ or greater, as measured according to the following conditions and calculated by the following equation (5).

$$\text{Amount of gas permeation} = (P_2 - P_1) \times 0.01105 \quad (5)$$

Here,
the end face exposed to the outside: the outer circumferential face with a diameter of 76 mm
the end face exposed to the inside of the chamber: the inner circumferential face with a diameter of 32 mm
the volumetric capacity of the chamber: 11,050 cm³.
the initial pressure (Pa) in the chamber: P1 (190 Pa)
the pressure (Pa) in the chamber after 30 minutes: P2

The expanded graphite sheet refers to a sheet formed of expanded graphite as its main component. Expanded graphite refers to a substance formed by immersing crystals of graphite such as natural graphite or kish graphite into an acid such as sulfuric acid or nitric acid to insert the acid into the interlayer space, then subjecting the resultant material to washing and neutralization, and then rapidly heating the resultant layered material so as to expand the graphite to be 100 to 300 times the original graphite crystal. Thereby, a flocculent graphite material (expandable graphite having been expanded) is obtained. The expanded graphite sheet used in the present invention is formed by compressing the expanded expandable graphite and molding it into a sheet shape. It is preferable that the heating temperature at the time of the expanding of the expandable graphite be 400° C. or higher, and more preferably 500° C. or higher. The upper limit of the heating temperature is not particularly restricted, but may be 1200° C., for example.

Figure 2:
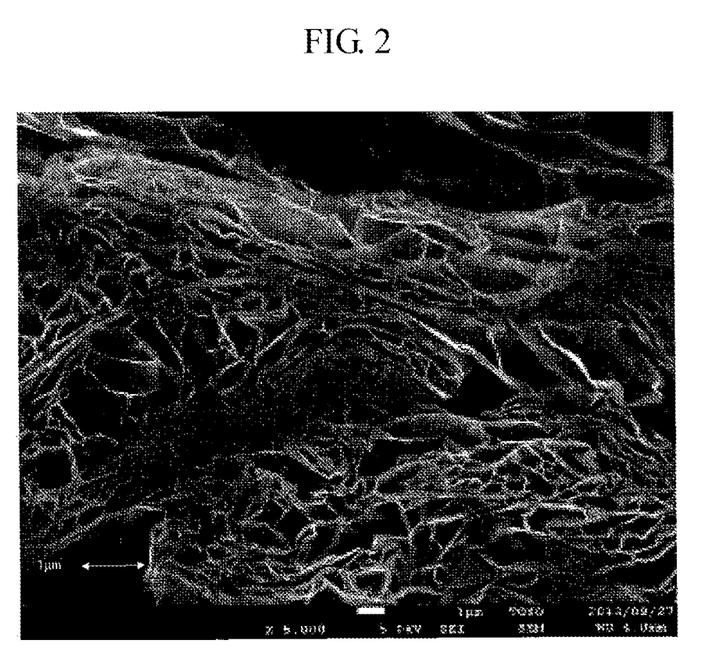
FIG. 2 is a cross-sectional image of an expanded graphite sheet having a bulk density of 0.4 $Mg/m^3$.
Figure 3:
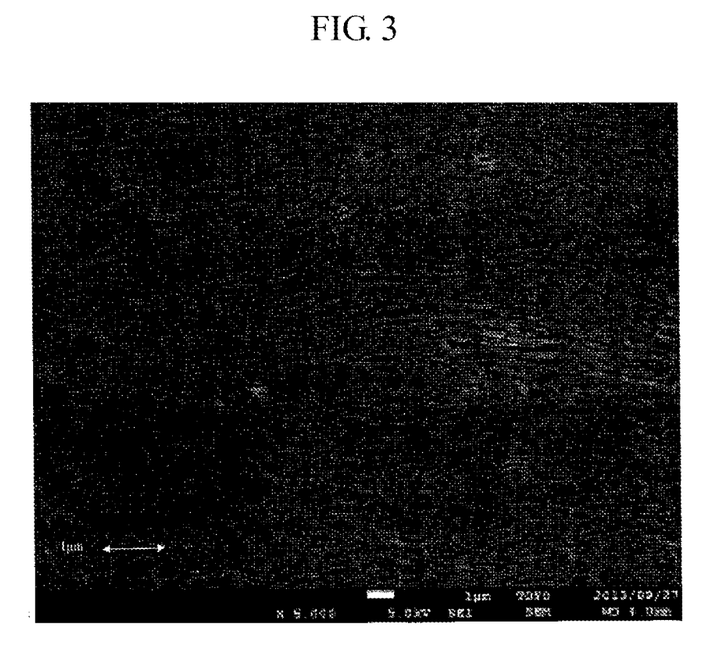
FIG. 3 is a cross-sectional image of an expanded graphite sheet having a bulk density of 2.0 $Mg/m^3$.

The cross-sectional images of the expanded graphite sheets are shown in FIGS. 2 and 3. The expanded graphite sheet shown in FIG. 2 is the one having a bulk density of 0.4 Mg/m³. Although it does not have clear communicating pores along the thickness direction, a large quantity of microgaps exists along in-plane directions. It is believed that the supply of ambient air, which is the origin of hydroxide ions, is effected by the ambient air passing through these microgaps. It is also believed that the surface of the expanded graphite sheet has a large quantity of surface irregularities, and the surface irregularities serve to increase the contact area with the electrolyte solution. The expanded graphite sheet shown in FIG. 3 is the one having a bulk density of 2.0 Mg/m³. It is demonstrated that even when the bulk density is higher, the microgaps exist therein.

EXAMPLES

First Embodiment

Example 1

Figure 4:
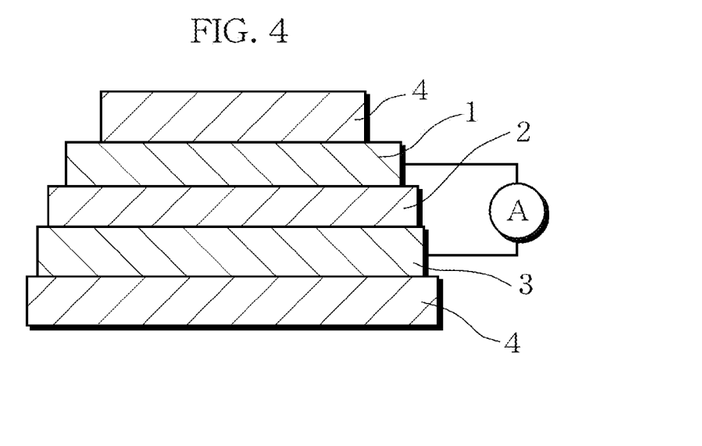
FIG. 4 is a schematic cross-sectional view of an air battery of the present invention.

As illustrated in FIG. 4, the air battery of the present invention has the following structure. An aluminum foil 1 (thickness: 0.1 mm) as the negative electrode, a paper wipe 2 (tradename: Kimwipe, made by Nippon Paper Crecia Co., Ltd.) impregnated with a salt solution (0.1 mol/L) as the electrolyte solution, and an expanded graphite sheet 3 (100% expanded graphite, thickness: 1.0 mm, bulk density: 0.4 Mg/m³) as the positive electrode are stacked successively to form a laminated material, and the laminated material is interposed between two 1 mm-thick acrylic resin plates 4. Note that the circumferential end face of the expanded graphite sheet 3 as the positive electrode is exposed to the ambient air.

First, the expanded graphite sheet as the positive electrode was prepared in the following manner.

First, an acid treatment solution was prepared by adding 5 parts by weight of hydrogen peroxide as an oxidizing agent to 100 parts by weight of strong sulfuric acid with a concentration of 98%, and natural graphite having an ash content of 0.01 weight % or lower was immersed and stirred in the acid treatment solution for 30 minutes to cause a reaction, whereby an acid treated graphite was obtained. Next, the resultant acid treated graphite was removed from the acid treatment solution, thereafter washed with water sufficiently to bring the pH closer to 7, and further dried.

Subsequently, the acid treated graphite having been washed with water was put in an electric furnace at a temperature of 800° C. to carry out a heating and expanding process, whereby an expanded graphite was prepared. Thereafter, the resultant expanded graphite was passed between rollers to compress the expanded graphite, so that an expanded graphite sheet having a bulk density of 0.4 g/cm³ and a thickness of 1.00 mm was prepared.

The air battery prepared in this manner is hereinafter referred to as Battery A1.

Example 2

An air battery was prepared in the same manner as described in Example 1 above, except that the bulk density and the thickness of the expanded graphite sheet as the positive electrode were set at 0.7 Mg/cm³ and 0.55 mm, respectively.

The air battery prepared in this manner is hereinafter referred to as Battery A2.

Example 3

An air battery was prepared in the same manner as described in Example 1 above, except that the bulk density and the thickness of the expanded graphite sheet as the positive electrode were set at 1.0 Mg/cm³ and 0.40 mm, respectively.

The air battery prepared in this manner is hereinafter referred to as Battery A3.

Example 4

An air battery was prepared in the same manner as described in Example 1 above, except that the bulk density and the thickness of the expanded graphite sheet as the positive electrode were set at 1.6 Mg/cm$^3$ and 0.24 mm, respectively.

The air battery prepared in this manner is hereinafter referred to as Battery A4.

Example 5

An air battery was prepared in the same manner as described in Example 1 above, except that the bulk density and the thickness of the expanded graphite sheet as the positive electrode were set at 2.0 Mg/cm$^3$ and 0.20 mm, respectively.

The air battery prepared in this manner is hereinafter referred to as Battery A5.

(Experiment)

Figure 5:
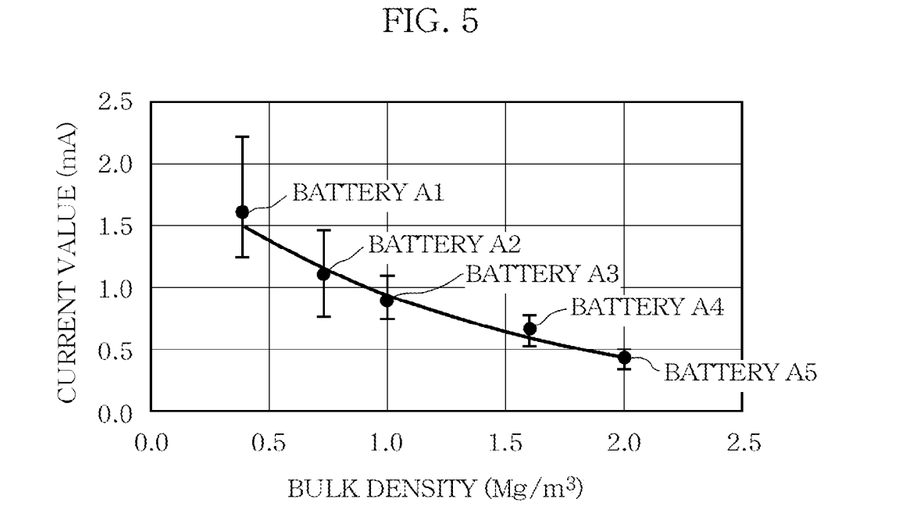
FIG. 5 is a graph illustrating the relationship between the bulk density and the current value for each of Batteries A1 to A5.
Figure 6:
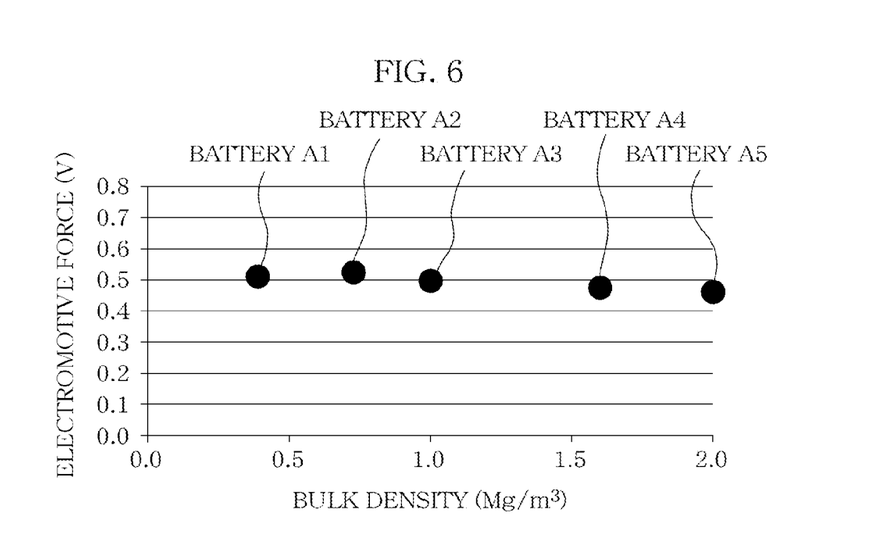
FIG. 6 is a graph illustrating the relationship between the bulk density and the electromotive force for each of Batteries A1 to A5.

Each of Batteries A1 to A5 was interposed between two acrylic resin plates, and the average current value and the average voltage for each of Batteries A1 to A5 over a period of from 30 seconds to 60 seconds after the start of the experiment were determined. The results are shown in FIGS. 5 and 6. The current value and the voltage were obtained as follows. A current-voltage tester was connected to the positive electrode and the negative electrode of each of the batteries, and the current value and the voltage were measured 4 times per second, so a total of 240 data values were obtained over a period of from 30 seconds to 60 seconds after the start of the experiment.

As clearly seen from FIG. 6, an electromotive force was confirmed even with each of Batteries A1 to A5, which used the expanded graphite sheet having closed pores, and the values were substantially constant, about 0.5 V, irrespective of the bulk density of the graphite sheet, as shown in FIG. 6. This indicates that, although the material having communicating pores along the thickness direction has been considered the most desirable positive electrode material, it is also possible to use the expanded graphite sheet having no communicating pore along the thickness direction as the positive electrode material.

Furthermore, as clearly seen from FIG. 5, when the bulk density was lower, the current value became higher. Thus, Battery A1, which had the lowest bulk density, resulted in the highest electromotive force. It is believed that the reason is as follows. When the graphite sheet has a lower bulk density, the surface of the graphite sheet is more irregular, so the contact surface area with the electrolyte solution increases macroscopically, improving the efficiency in supplying hydroxide ions to the electrolyte solution. As a result, the amount of O$_2$ supplied to the electrolyte solution is greater. When the bulk density of the graphite sheet is lower, the electrical resistance as the electrode becomes higher. However, it is believed that the magnitude of the electromotive force exceeded the influence from the resistance value, and as a result, the current value improved even when the bulk density of the graphite sheet was low.

From these results, it was confirmed that the expanded graphite sheet functions suitably as the positive electrode material for a metal air battery.

Figure 7:
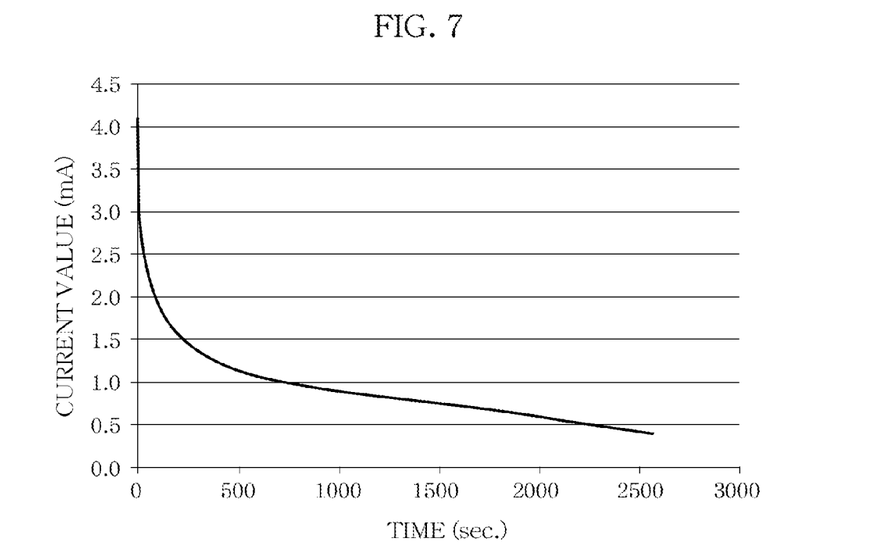
FIG. 7 is a graph illustrating the relationship between the current values versus time for Battery A1 until the consumption of the aluminum foil reaches the limit.
Figure 8:
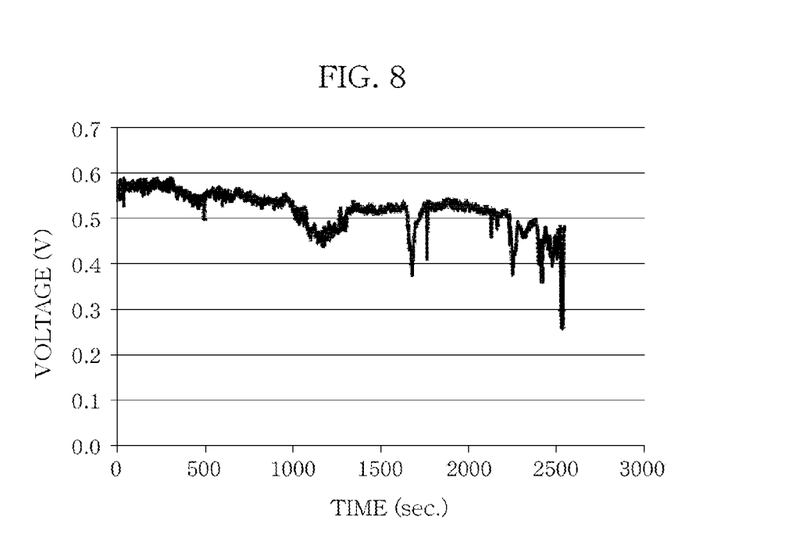
FIG. 8 is a graph illustrating the relationship between the voltage versus time for Battery A1 until the consumption of the aluminum foil reaches the limit.

Furthermore, for Battery A1, the current value and the voltage were measured up to 2500 seconds (about 42 minutes), until the time at which the consumption of the aluminum foil reached the limit. The results are shown in FIGS. 7 and 8. The current values shown in FIG. 7 indicate that electric current was produced even after the oxygen remaining between the positive electrode and the electrolyte solution was consumed. No significant deterioration was observed in the voltage shown in FIG. 8 either. These results indicate that oxygen was supplied by the ambient air passing through the microgaps between the particles in the expanded graphite sheet, so the supply of hydroxide ions was continued.

Second Embodiment

Example 1

An air battery was prepared in the same manner as described in Example 1 of the first embodiment above, except that the expanded graphite sheet used as the positive electrode had a bulk density of 1.0 Mg/cm$^3$ and a thickness of 0.20 mm, and that an aluminum plate (thickness 0.3 mm) was used as the negative electrode.

The air battery prepared in this manner is hereinafter referred to as Battery B1.

Examples 2 to 6

Air batteries were prepared in the same manner as described in Example 1 of the second embodiment above, except that the expanded graphite sheets used as the positive electrode had thicknesses of 0.40 mm, 0.60 mm, 0.80 mm, 1.00 mm, and 1.50 mm, respectively.

The air batteries prepared in this manner are hereinafter referred to as Batteries B2 to B6, respectively.

Examples 7 to 9

Air batteries were prepared in the same manner as described in Example 6 of the second embodiment above, except that the densities and the thicknesses of the expanded graphite sheets used as the positive electrode were as shown in Table 2 below.

The air batteries prepared in this manner are hereinafter referred to as Batteries B7 to B9, respectively.

(Experiment)

Figure 9:
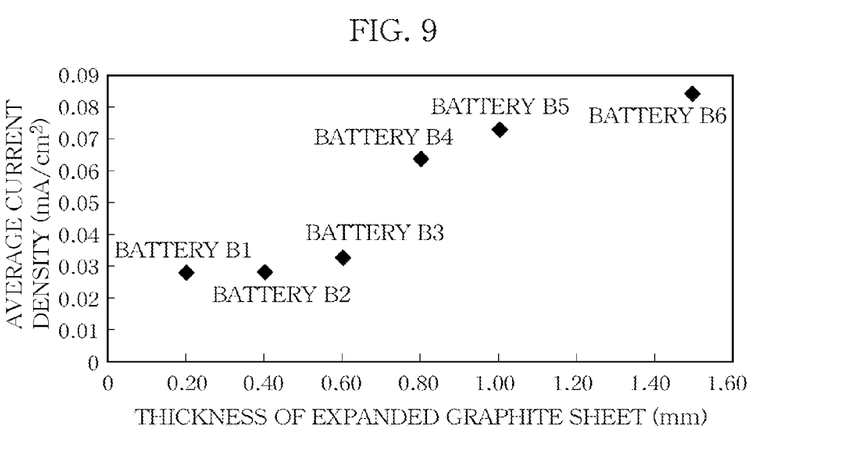
FIG. 9 is a graph illustrating the relationship between the thickness of the expanded graphite sheet and the average current density for each of Batteries B1 to B6.
Figure 10:
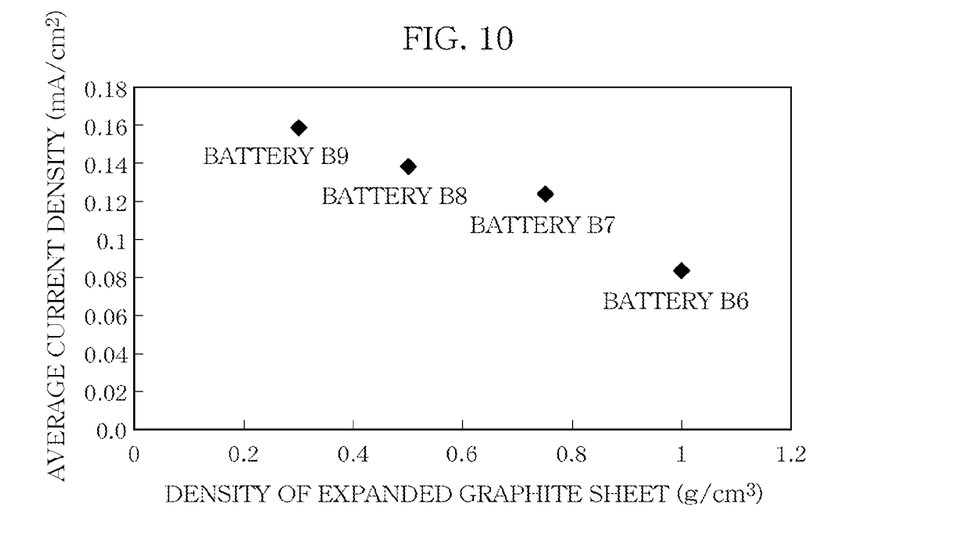
FIG. 10 is a graph illustrating the relationship between the density of the expanded graphite sheet and the average current density for each of Batteries B6 to B9.
Figure 11:
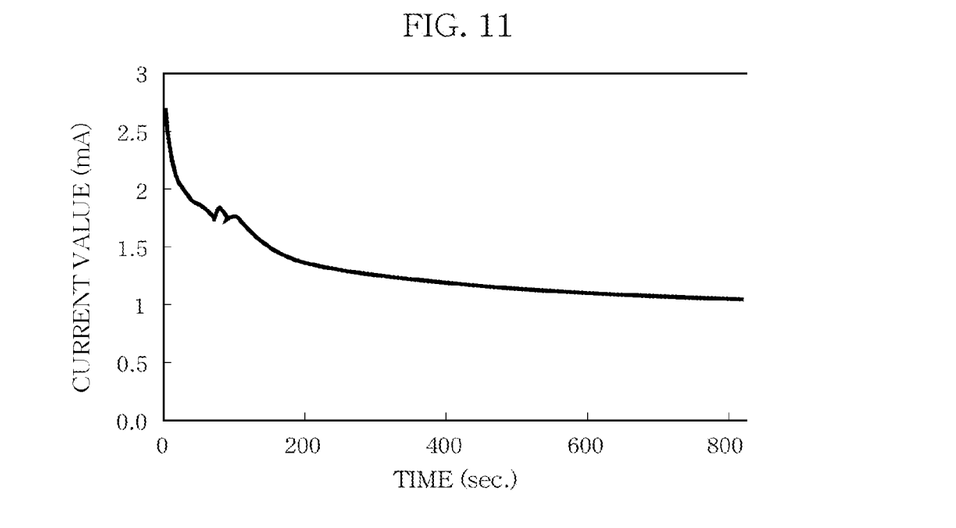
FIG. 11 is a graph illustrating the relationship between the current values versus time (up to 900 seconds) for Battery B5.
Figure 12:
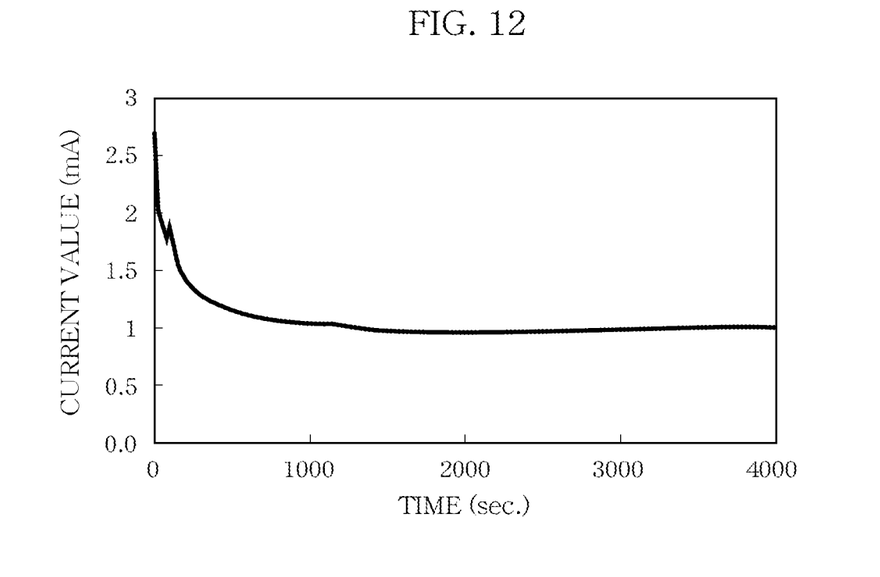
FIG. 12 is a graph illustrating the relationship between the current values versus time (up to 4000 seconds) for Battery B5.

The amount of gas permeation, the average current density over a period of up to 2000 seconds, and the average current density were determined for the just-mentioned Batteries B1 to B9. The results are shown in Tables 1 and 2 below. In addition, the relationship between the thickness of the expanded graphite sheet and the average current density for each of Batteries B1 to B6 is shown in FIG. 9. Also, the relationship between the density of the expanded graphite sheet and the average current density for each of Batteries B6 to B9 is shown in FIG. 10. Moreover, for Battery B5, the relationship between the current values versus time is shown in FIGS. 11 and 12.

In the experiment, each of Batteries B1 to B9 was interposed between two acrylic resin plates, and the current values were measured. A current-voltage tester was connected to the positive electrode and the negative electrode of each of the batteries, and the current values were measured four times per second. The current density was obtained by dividing the current value by the area of the negative electrode, which is smaller than the area of the positive electrode.

TABLE 1

| Battery | Expanded graphite sheet | | Amount of gas permeation (Pa · m³) | Average current value up to 2000 sec. (mA) | Average current density up to 2000 sec. (mA/cm²) |
| --- | --- | --- | --- | --- | --- |
| | Density (g/cm³) | Thickness (mm) | | | |
| B1 | 1.0 | 0.20 | 0.03 | 0.469 | 0.029 |
| B2 | | 0.40 | 0.03 | 0.479 | 0.029 |
| B3 | | 0.60 | 0.04 | 0.530 | 0.033 |
| B4 | | 0.80 | 0.05 | 1.024 | 0.064 |
| B5 | | 1.00 | 0.06 | 1.180 | 0.073 |
| B6 | | 1.50 | 0.15 | 1.349 | 0.084 |

TABLE 2

| Battery | Expanded graphite sheet | | Amount of gas permeation (Pa · m³) | Average current value up to 2000 sec. (mA) | Average current density up to 2000 sec. (mA/cm²) |
| --- | --- | --- | --- | --- | --- |
| | Density (g/cm³) | Thickness (mm) | | | |
| B6 | 1.0 | 1.50 | 0.15 | 1.349 | 0.084 |
| B7 | 0.75 | 2.00 | 0.32 | 1.990 | 0.124 |
| B8 | 0.5 | 3.00 | 0.66 | 2.212 | 0.138 |
| B9 | 0.3 | 5.00 | 1.46 | 2.553 | 0.159 |

As clearly seen from Table 1, it is demonstrated that as the thickness of the expanded graphite sheet increases (from Battery B1 to Battery B6), the amount of gas permeation increases, and the average current value and the average current density over a period of up to 2000 seconds become higher. In particular, as clearly seen from FIG. 9, the average current density is remarkably high when the thickness of the expanded graphite sheet is 0.80 mm or greater.

Moreover, as clearly seen from Table 2 and FIG. 10, it is demonstrated that as the density of the expanded graphite sheet decreases and the thickness thereof increases (from Battery B6 to Battery B9), the amount of gas permeation increases, and the average current value and the average current density over a period of up to 2000 seconds become higher. Furthermore, as clearly seen from FIGS. 11 and 12, no deterioration of the electromotive force was observed in Battery B5 even at later than 4000 seconds after the start of the experiment. However, because the electrolyte solution dried up, the measurement of the current value was no longer possible beyond that point. (Note that problems associated with the consumption of the aluminum plate did not occur.)

Third Embodiment

Examples 1 to 4

Air batteries were prepared in the same manner as described in Examples 6 to 9 of the second embodiment above, except that KOH was used as the electrolyte solution.

The air batteries prepared in this manner are hereinafter referred to as Batteries C1 to C4, respectively.

(Experiment)

Figure 13:
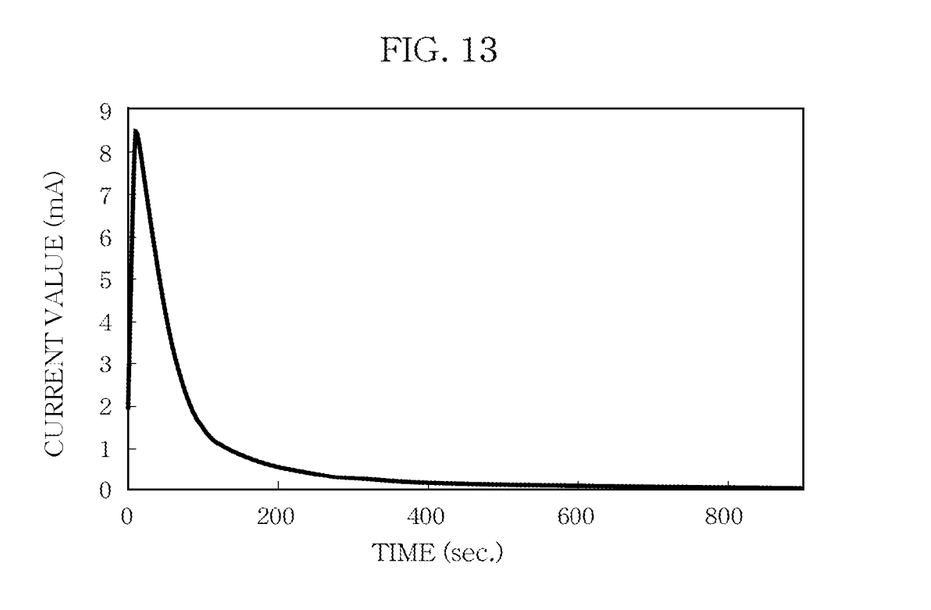
FIG. 13 is a graph illustrating the relationship between the current values versus time for Battery C1.
Figure 14:
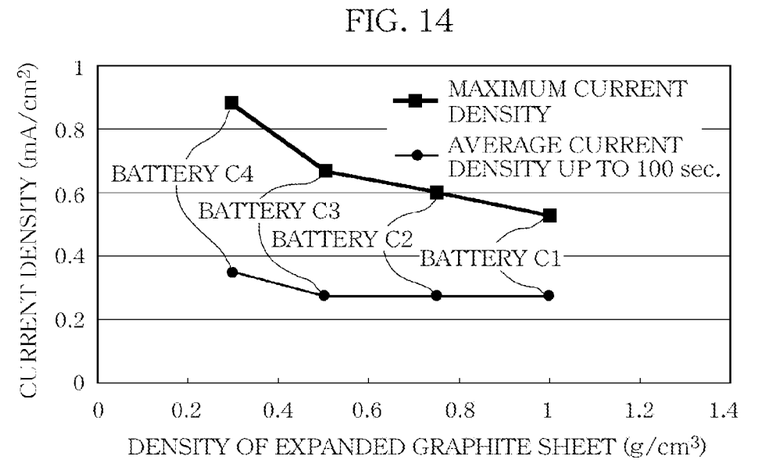
FIG. 14 is a graph illustrating the relationship between the density of the expanded graphite sheet and the current density (the average current density over a period of up to 100 seconds and the maximum current density) for each of Batteries C1 to C4.
Figure 15:
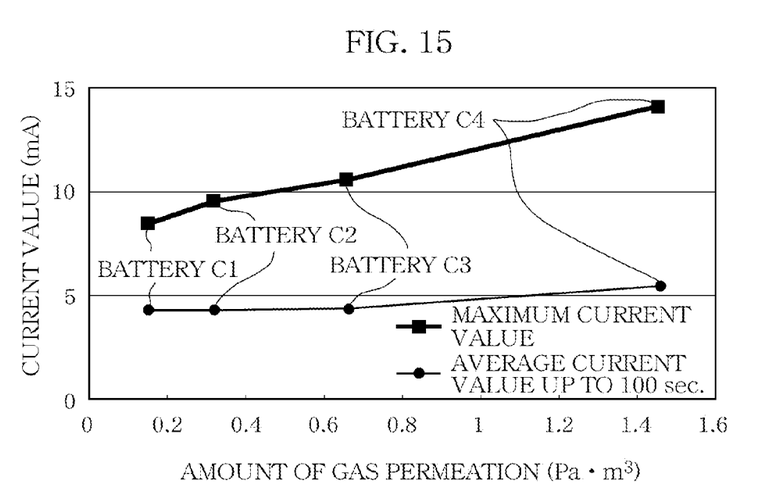
FIG. 15 is a graph illustrating the relationship of the amount of gas permeation with the average current value over a period of up to 100 seconds and the maximum current value for each of Batteries C1 to C4.

The amount of gas permeation, the average current density over a period of up to 100 seconds, and the maximum current density were determined for the just-mentioned Batteries C1 to C4. The results are shown in Table 3 below. The relationship between the current values versus time in battery C1 is shown in FIG. 13. Moreover, the relationship between the density of the expanded graphite sheet and the current density (the average current density over a period of up to 100 seconds and the maximum current density) for each of Batteries C1 to C4 is shown in FIG. 14. In addition, the relationship of the amount of gas permeation and the current values (the average current value over a period of up to 100 seconds and the maximum current value) for each of Batteries C1 to C4 is shown in FIG. 15.

In the experiment, each of Batteries C1 to C4 was interposed between two acrylic resin plates, and the current values were measured. A current-voltage tester was connected to the positive electrode and the negative electrode of each of the batteries, and the current values were measured four times per second. The current density was obtained by dividing the current value by the area of the negative electrode, which is smaller than the area of the positive electrode.

TABLE 3

| Battery | Expanded graphite sheet | | Amount of gas permeation (Pa · m³) | Average current density up to 100 sec. (mA/cm²) | Maximum current density (mA/cm²) |
| --- | --- | --- | --- | --- | --- |
| | Density (g/cm³) | Thickness (mm) | | | |
| C1 | 1.0 | 1.50 | 0.15 | 0.276 | 0.530 |
| C2 | 0.75 | 2.00 | 0.32 | 0.274 | 0.598 |
| C3 | 0.5 | 3.00 | 0.66 | 0.276 | 0.664 |
| C4 | 0.3 | 5.00 | 1.46 | 0.347 | 0.883 |

As clearly seen from Table 3, it is demonstrated that when both the thickness and the density of the expanded graphite sheet are varied, the amount of gas permeation and the maximum current density increase as the density becomes lower and the thickness becomes greater (from Battery C1 to Battery C4) (the average current density over a period of up to 100 seconds shows a slightly different tendency). In addition, FIG. 14 clearly shows that, in Batteries C1 to C4, the average current density and the maximum current density are higher when the density of the expanded graphite sheet is lower. Furthermore, FIG. 15 clearly shows that, in Batteries C1 to C4, the average current value and the maximum current value are higher when the amount of gas permeation is greater.

Furthermore, as clearly seen in FIG. 13, it is observed that in Battery C1, although the current value is high at the beginning of discharge, the current value approaches 0 as the time elapses. The reason is believed to be that, because the electrolyte solution (KOH) is a strong alkali, a film of a non-conductive material is formed on the surface of the aluminum over time.

Other Embodiments (1) The graphite that is used as the raw material is not limited to natural graphite as described above, but may be pyrolytic graphite, kish graphite, and the like. However, it is preferable to use natural graphite flake, which is readily industrially available. In addition, it is desirable that the grain size of the graphite be from 30 mesh to 100 mesh.

(2) The sulfuric acid used in the acid treatment is not limited to the strong sulfuric acid, and it is sufficient as long as a sulfur component is contained, such as with sulfuric anhydride and fuming sulfuric acid. However, for industrial purposes, it is desirable to use a strong sulfuric acid with a concentration of 90% or higher, more preferably a concentration of from 95% to 98%. Moreover, the duration of the immersing and stirring of the graphite is not limited to 30 minutes, but it is desirable that the duration be from about 15 minutes to about 60 minutes.

(3) The oxidizing agent is not limited to hydrogen peroxide as described above, but may be ammonium peroxide, potassium peroxide, and the like. In addition, the amount thereof to be added may be from 1 to 10 parts by weight with respect to 100 parts by weight of the sulfuric acid.

(4) The method for neutralizing the acid treated graphite is not limited to sufficient washing with water. It may be carried out by using a solid neutralizer agent selected from oxides of alkaline-earth metals, hydroxides, carbonates, and the like.

(5) The present invention is not limited to the above-described aluminum air battery. It is also possible that the present invention may be applied to other batteries such as a zinc air battery, an iron air battery, a magnesium air battery, a sodium air battery, and a calcium air battery.

INDUSTRIAL APPLICABILITY

The present invention is applicable for use in, for example, batteries for hearing aid devices, batteries for electric vehicles, batteries for hybrid vehicles, and batteries for fuel cell vehicles.

The invention claimed is:

1. A positive electrode for an air battery, characterized by consisting essentially of an expanded graphite sheet, which consists essentially of expanded graphite.

2. The positive electrode for an air battery according to claim 1, wherein the expanded graphite sheet has a bulk density of from 0.2 Mg/m3 to 2.0 Mg/m3.

3. The positive electrode for an air battery according to claim 2, wherein the expanded graphite has a bulk density of from 0.2 Mg/m3 to 0.75 Mg/m3.

4. The positive electrode for an air batter according to claim 1, wherein the expanded graphite sheet has a thickness of from 0.10 mm to 3.0 mm.

5. The positive electrode for an air battery according to claim 2, wherein the expanded graphite sheet has a thickness of from 0.10 mm to 3.0 mm.

6. The positive electrode for an air battery according to claim 3, wherein the expanded graphite sheet has a thickness of from 0.10 mm to 3.0 mm.

7. The positive electrode for an air battery according to claim 4, wherein the expanded graphite sheet has a thickness of from 0.80 mm to 3.0 mm.

8. The positive electrode for an air battery according to claim 5, wherein the expanded graphite sheet has a thickness of from 0.80 mm to 3.0 mm.

9. The positive electrode for an air battery according to claim 6, wherein the expanded graphite sheet has a thickness of from 0.80 mm to 3.0 mm.

10. The positive electrode for an air battery according to claim 1, wherein a gas permeability of the expanded graphite sheet is $1.0 \times 10^{-3}$ cm2/s or less.

11. An air battery comprising of positive electrode, a negative electrode, and an electrolyte solution, characterized in that the positive electrode consists essentially of an expanded graphite sheet, which consists essentially of expanded graphite, wherein the expanded graphite sheet has a thickness of from 0.10 mm to 3.0 mm.

12. The air battery according to claim 11, wherein the expanded graphite sheet includes one side being in contact with the electrolyte solution and the other side opposite the one side, the other side being shielded from ambient air.

* * * * *